May 22, 1945.   F. F. RUAU   2,376,556
TESTING, SORTING, OR GRADING APPARATUS
Filed June 24, 1941   6 Sheets-Sheet 1

May 22, 1945. F. F. RUAU 2,376,556
TESTING, SORTING, OR GRADING APPARATUS
Filed June 24, 1941 6 Sheets-Sheet 3

Patented May 22, 1945

2,376,556

UNITED STATES PATENT OFFICE 2,376,556

TESTING, SORTING, OR GRADING APPARATUS

Félix Frédéric Ruau, London S. E. 8, England, assignor to Molins Machine Company, Limited, London, England Application June 24, 1941, Serial No. 399,561
In Great Britain July 13, 1940

19 Claims. (Cl. 209—89)

This invention concerns improvements in or relating to apparatus for testing, sorting or grading articles, for example apparatus for testing the ends of cigarettes or apparatus for weighing articles such as cigarettes, or apparatus for testing by gauging or measuring sizes or dimensions. For convenience, testing, sorting or grading apparatus will hereinafter be referred to as "testing apparatus."

According to the present invention there is provided testing apparatus comprising in combination, a magnetic device having a magnet and an armature, and means to effect relative movement between the armature and a pole of the magnet (e. g. in response to a measurement or a weight characteristic) to an extent determined by an object or an article being tested, so that when the armature is within a predetermined distance from the said pole it is movable towards the said pole by magnetic attraction.

Further according to the present invention there is provided testing apparatus comprising in combination, a magnetic device having an armature movable between two magnetic poles and means to effect relative movement between the armature and the poles (e. g. in response to a measurement or a weight characteristic) to an extent determined by an object or an article being tested, so that when the armature is within a predetermined distance from a pole it is movable towards that pole by magnetic attraction.

Further according to the invention there is provided testing apparatus comprising in combination, a magnetic device having two armatures which are movable between two magnetic poles during a testing operation and which are offset along the lines of force by a distance equal to the tolerance to be allowed, stops to limit the said distance between the armatures in the offset relationship, and means to effect relative movement between the armatures and the said poles (e. g. in response to weight or measurement characteristics) to an extent determined by an article or an object being tested, so that when an armature is, when considered in a direction normal to a plane transverse to the lines of force, within a predetermined distance from a pole on the side opposite to that at which its stop is located, the armature will be caused to move by magnetic attraction towards that pole.

Further according to the invention there is provided testing apparatus comprising the combination of a magnetic device having a magnet, a stop and an armature mounted so as to be resiliently urged in one direction towards the stop with means to effect relative movement between a pole of the magnet and the armature across the lines of force emanating from said pole, and means to effect relative movement between the armature and the said pole (e. g. in response to a measurement or a weight characteristic) to an extent determined by an object or an article being tested so that when the armature is within a predetermined distance from the pole it is movable by magnetic attraction towards the latter in the opposite direction to that in which it is resiliently urged.

Means may be provided to effect relative movement (e. g. in an arcuate path) between the armature and the pole or poles or between the armatures and the poles in a plane substantially normal to the direction of said relative movement determined by an object or an article being tested and independent of said latter movement. The armature or each of them may be resiliently urged towards a stop in a direction opposite to that in which it is to be movable by magnetic attraction towards a pole when within a predetermined distance therefrom.

The means to effect relative movement between an armature and a pole to an extent determined by an object or article being tested may comprise a member movable during a testing operation to a position determined by the said object or the said article, the movable member being operatively coupled to one of the relatively movable elements of the magnetic device. The movable member may be operatively coupled to a reciprocable carrier on which the pole is supported.

In apparatus as set forth above in which an armature is movable between the poles, the said poles may be of like polarity and the armature or armatures movable between them may be of opposite polarity.

Further according to the invention there is provided testing apparatus adapted to reject or separate "defective" (e. g. soft-ended) cigarettes from "satisfactory" cigarettes (e. g. for use with a cigarette making machine), comprising in combination, a pair of elements arranged to engage the opposite ends of a cigarette, at least one element of the pair comprising an armature and being resiliently mounted to move inwardly towards the other, a magnet one pole of which magnetically attracts the armature when the said elements are spaced apart by a predetermined distance, said movement of the armature due to magnetic attraction causing "satisfactory" cigarettes to be released from the said elements, and means to release a "defective" cigarette from the said elements at a different position. The armature may be moved past the pole in a plane substantially normal to the direction in which one of said elements is resiliently urged towards the other. The pole may be resiliently supported and means provided to adjust the position of the magnet in a direction transverse to the direction of movement of the armature past the pole. The armature may be movable between two magnetic poles.

Some embodiments of the invention will be described, by way of example, with reference to the accompanying drawings in which.

Figure 1:
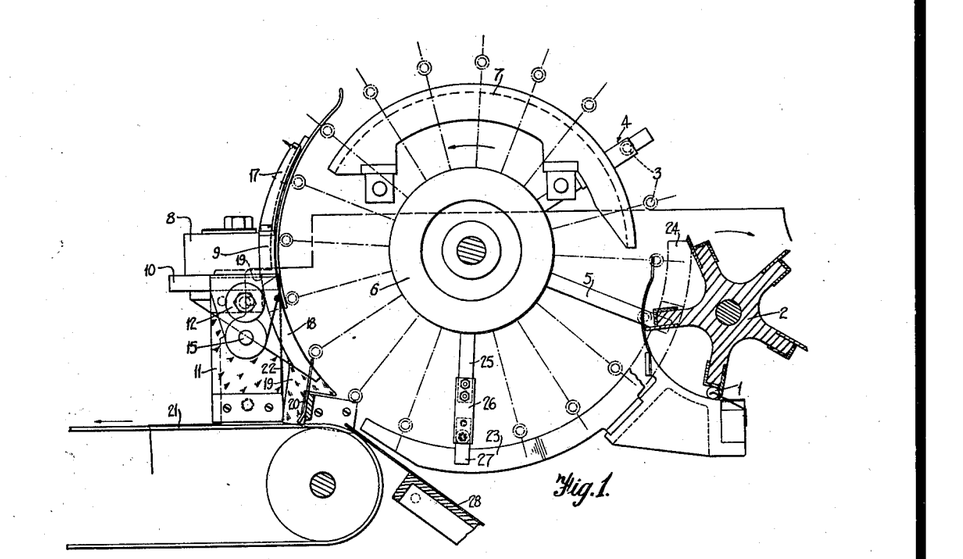
Figure 1 is a front elevation, partly in section, of an apparatus for testing the ends of cigarettes.
Figure 2:
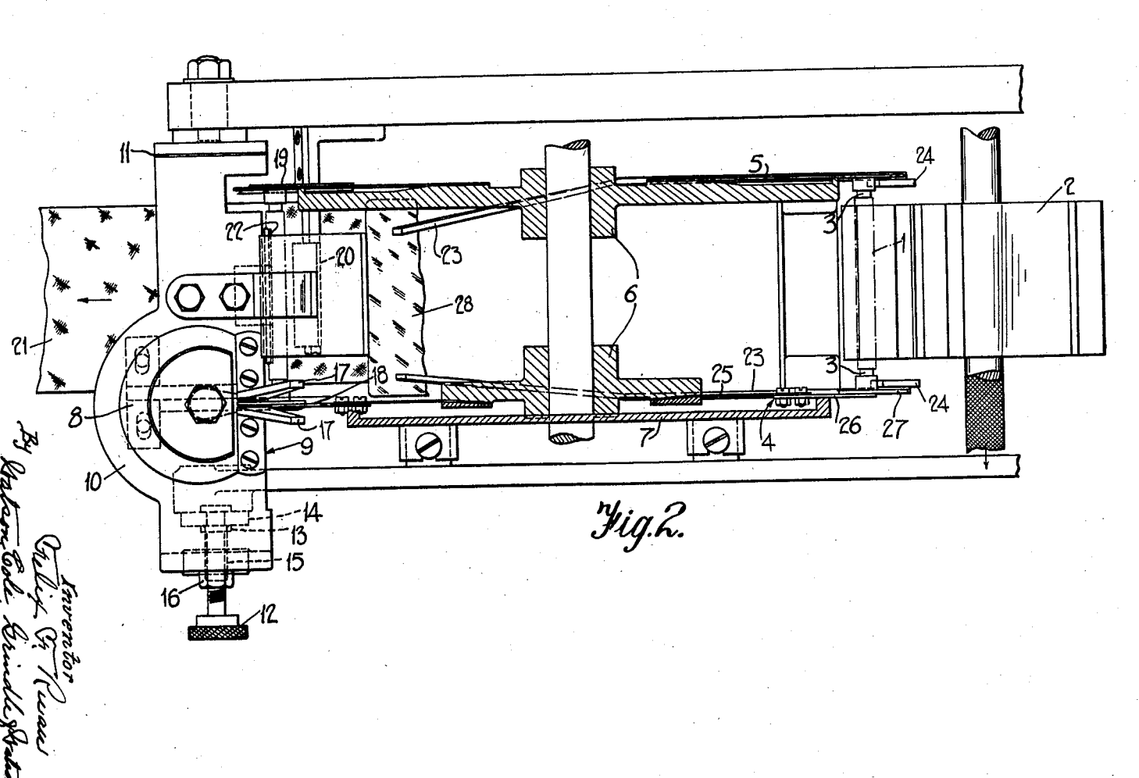
Figure 2 is a plan of Figure 1, partly in section.

Referring to Figures 1 and 2 which show an apparatus for testing the ends of cigarettes, the construction is generally similar to that shown and described in British Patent Specification No. 517,103 and only a brief description of its general construction is necessary here.

Cigarettes 1 as they issue from a continuous rod type cigarette making machine are moved laterally one at a time out of the rod line by a rotating deflector 2 and are delivered one at a time between oppositely disposed elements which comprise feelers or grippers 3. The feelers or grippers are arranged in pairs, each feeler being supported by an arm 4 or 5, as referred to in detail later, mounted on a rotatable carrier 6. At least one of the arms, in this case the arm 4, comprises a registering element and is resiliently mounted so that the arm tends to move towards the other arm of the pair. As shown, both arms of a pair are resilient, but the arm 5 is of stiffer material than the arm 4 and may be considered as relatively rigid.

A cigarette is gripped at its opposite ends by the pair of opposed feelers and the carrier 6 rotates in the direction of the arrow Figure 1 and thus moves the feelers, the path of the resilient arm 4 being determined by the distance between the opposed feelers, this distance being, of course, determined by the hardness of the ends of the cigarettes being tested and to any difference in the length of the cigarette from the nominal value. As described in British Patent Specification No. 517,103, the tested cigarettes are delivered at different points according to whether the cigarettes are "defective" or "satisfactory," this state being ascertained by the testing of the cigarette. A support member 7 is provided to steady the arms 4 in the manner described in the specification referred to. At some suitable position, the resilient arm 4 is moved between magnetic poles of opposite polarity provided in the present case by a permanent magnet 8. Between the spaced poles there is a neutral zone and when the resilient arm 4 moves through the magnetic field to one side of this neutral zone, the arm, the end of which is constructed of magnetic material, is attracted to the nearest magnetic pole and the arm 4, therefore, comprises an armature. The neutral zone is so arranged relatively to the resilient arm 4, that when a defective cigarette (i. e. a soft ended or short cigarette) is being held the resilient arm 4 will either pass through the neutral zone or on that side of it nearer to the opposed gripper arm 5. In this way the resiliently mounted arm will not be attracted to release a cigarette unless it is the proper length and has ends of the desired quality. The released cigarette may be permitted to fall in to any suitable receptacle or may be delivered to any desired position for example as described below. Thus the dividing line between "satisfactory" and "defective" cigarettes is a line on one side of which the arm is moved by magnetic attraction away from the opposite gripper so as to release the cigarette and to the other side of which the arm is either unaffected by the magnet or it is urged towards the opposed gripper. In both these latter cases the cigarettes would not be released at that position but are mechanically released at a place different from that at which the "satisfactory" cigarettes are released as above described.

The magnet 8 is provided with pole pieces 9 and as the adjustment of the latter with respect to the path of the arm 4 must be fairly accurate, means are provided for shifting the magnet after the apparatus is set up. The magnet is bolted to a platform 10 which is supported at one end by a flat spring 11 suitably clamped to the platform and to the machine frame. At the other end an adjusting screw 12 is provided and is furnished with a grooved collar 13, Figure 2, which is rotatable in a hole in a plate 14 also fixed to the machine frame. A guide pin 15 is provided to guide the platform and when the locknut 16 is tightened after the adjustment has been made, the whole magnet support is rigid. The magnet may also be adjusted transversely of the platform by loosening the bolt and sliding the magnet, which is guided by the pole pieces, in a groove in the platform. Guides 17 are attached to the pole pieces to guide the arms 4 and prevent injury thereto in case an arm might be displaced from its general path, for example in case a cigarette is missing from between a pair of feelers.

Once the arm 4 has been attracted to one side or other of the neutral zone it is constrained to continue in the path thus determined by a cam 18 supported by the platform 10. In the case of "satisfactory" cigarettes the arm will lie on that face of the cam 18 which is visible in Figure 1 and conversely in the case of "defective" cigarettes the arm will lie on the opposite face of the cam 18. To ensure that the cigarettes released at this position are permitted to fall away from the grippers promptly and cleanly, a cam 19 is fixed to the frame and operates to move an arm 5 slightly further away from its cooperating arm 4 at the same time as the latter is influenced by the magnet.

"Satisfactory" cigarettes are thus discharged from the feelers, as the latter move away from the magnet, and they roll down a guide plate 20 on to the catcher band 21 as described in the specification referred to. A control flap 22 is also provided as described therein. Those cigarettes which are "defective" (i. e. short or soft ended) remain in the grippers until these reach a position further from the magnet than in the previous case. Then the arms 4 and 5 begin to engage cams 23 and are opened, whereupon the discharged cigarette rolls down a guide 28 to a waste box or the like. Ultimately the arms reach stepped portions 24 at the ends of the cams 23 and close in to their free position ready for the next cigarette they are to convey.

The arms 4 may be entirely composed of magnetic material but the construction shown in the drawings is preferred. In this construction the arm comprises three parts, viz: a spring portion 25, made for example of spring steel, a clamp 26, made of non-magnetic material, for example brass and an end portion 27 made of magnetic material. Since this construction is of much the same character in its essentials as that shown in Figures 1 and 2, it is deemed unnecessary to illustrate it or describe it further.

The embodiment of the invention which is shown in Figures 3, 4, 5 and 6 comprises apparatus for testing by gauging or measuring dimensions of cartridge cases. In such apparatus each cartridge case is subjected to a number of gauging operations each of which is, usually, effected independently of the others. Since the same principle is applied to different gauging operations it will be convenient, for the purposes of illustration, only to describe fully one such operation and the operation selected for description is the gauging or measuring of the overall length of a cartridge case. Some reference, is, however, made to the succeeding gauging operation for convenience in illustration and description.

A plurality of cartridge cases 30, hereinafter referred to, for convenience, as "cases," is contained in a magazine 31 which is arranged at an angle to the horizontal plane so that the cases are gravitationally moved towards the lower end of the magazine. The cases are received, one at a time, from the lower end of the magazine by a transfer device 32 comprising a pair of transfer plates mounted for rotation with a positively rotated shaft 33. The plates are spaced apart from each other along the longitudinal axis of the shaft by a distance which is less than the length of a case and are each provided with aligned peripheral hooks 34 in which a case is received from the lower end of the magazine. The shaft 33 is continuously rotated during the operation of the apparatus, and for this purpose is provided with a spiral gear 35 at its end which engages another spiral gear 36 on a driving shaft 37, mounted in bearings 38 fixed to the machine frame 39 and driven by a motor not shown.

In order to control the movement of cases from the magazine 31 to the hooks 34 a rocking catch or gate member 40 is provided which is attached as described below to a spindle 41 journalled in the frames 39 and oscillated by a cam 42 which is fixed to the shaft 33. An arm 43 fixed to the spindle 41 has a roller 44 at its end which engages the cam, the return movement being by a spring 45. It sometimes happens that a case becomes jammed beneath a prong of the gate and to permit easy removal of such a case the gate is operatively coupled to the spindle 41 by a spring clutch. This consists of a clutch collar 46 fixed to the spindle and a spring 47 which presses the gate against the collar and thus keeps the parts in operative engagement. If a jam occurs, the operator presses the gate in the direction of the arrow Figure 4 and is able to remove the jammed case.

During its movement from the magazine to the gauging position the case rolls on support plates 48 and is controlled by a rail 49 which guides the head of the case, said rail also forming part of the magazine 31.

Figure 5:
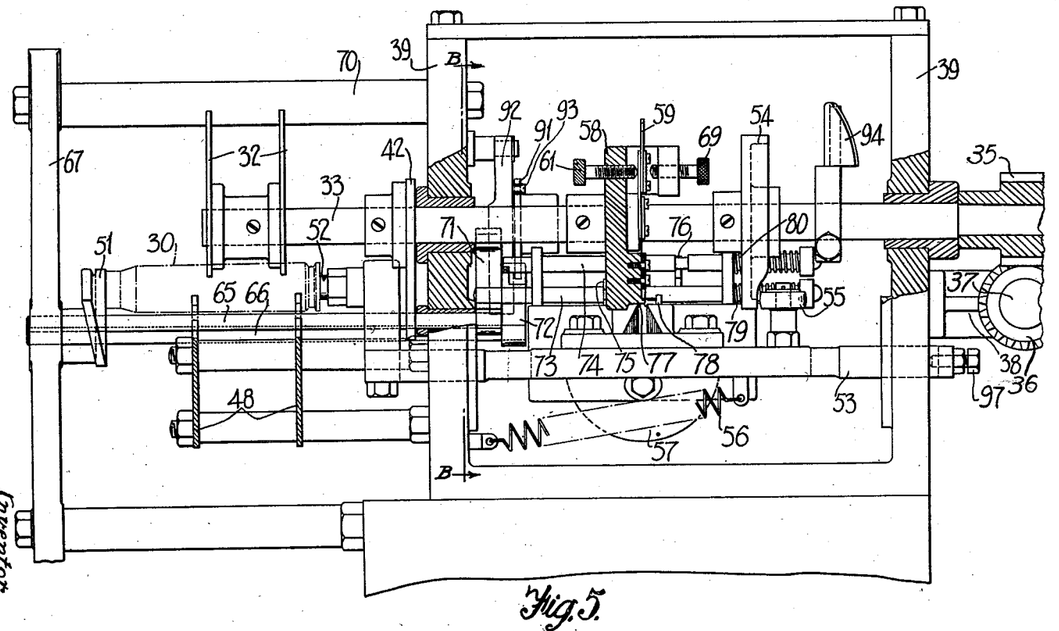
Figure 5 is an end elevation looking in the direction of the arrows AA Figure 3 but showing moving parts in a different position and partly in section, some parts being omitted.

A case which has been received by the transfer plates 32 is moved thereby to the gauging position where it is accommodated in V grooves 50 on the support plates 48. The gauging or measuring device comprises a fixed element 51 and a movable member 52 which latter is mounted for reciprocal movement in a direction parallel with the longitudinal axis of the shaft 33. At one end of the case, the movable member 52 engages the base to move the opposite end of the case against the fixed element 51. The movable member is mounted on an axially sliding bar 53 for movement therewith and the axis of the bar is parallel with the longitudinal axis of the shaft 33. Movement of the bar, which slides in slots in the frame 39, is effected in one direction by a cam 54 and roller 55, the cam being mounted on the rotary shaft 33. The axially sliding bar is moved to effect a gauging operation by a spring 56 so that when the movable member 52 has moved the case against the fixed element 51, the bar is arrested and gauging takes place under the pressure of spring 56 which is constant for any of the trivial differences in length to be met with in the gauging of such cases. An adjustable stop 97 prevents the bar 53 from moving too far under the action of the spring 56 and the clearance between the cam 54 and roller 55 in Figure 5 is to ensure that the bar can move far enough for gauging without hindrance by the cam.

Figure 3:
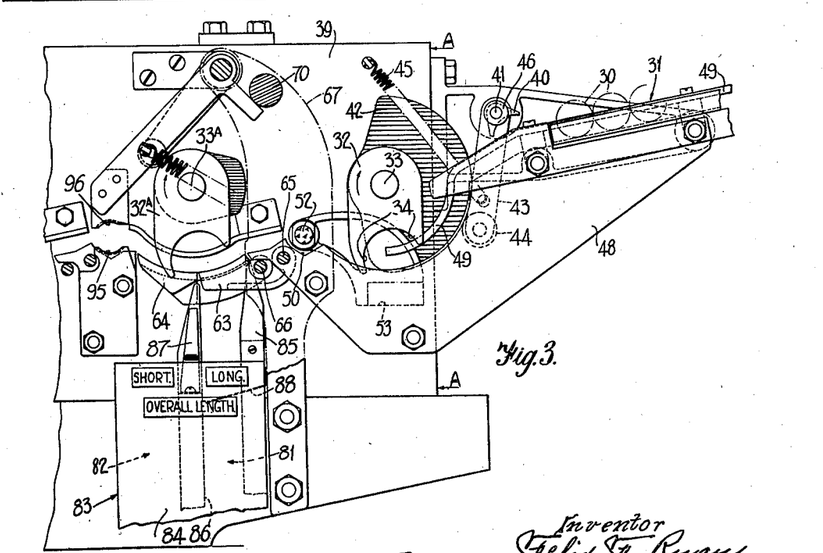
Figure 3 is a front elevation of a gauging machine.
Figures 4, 6:
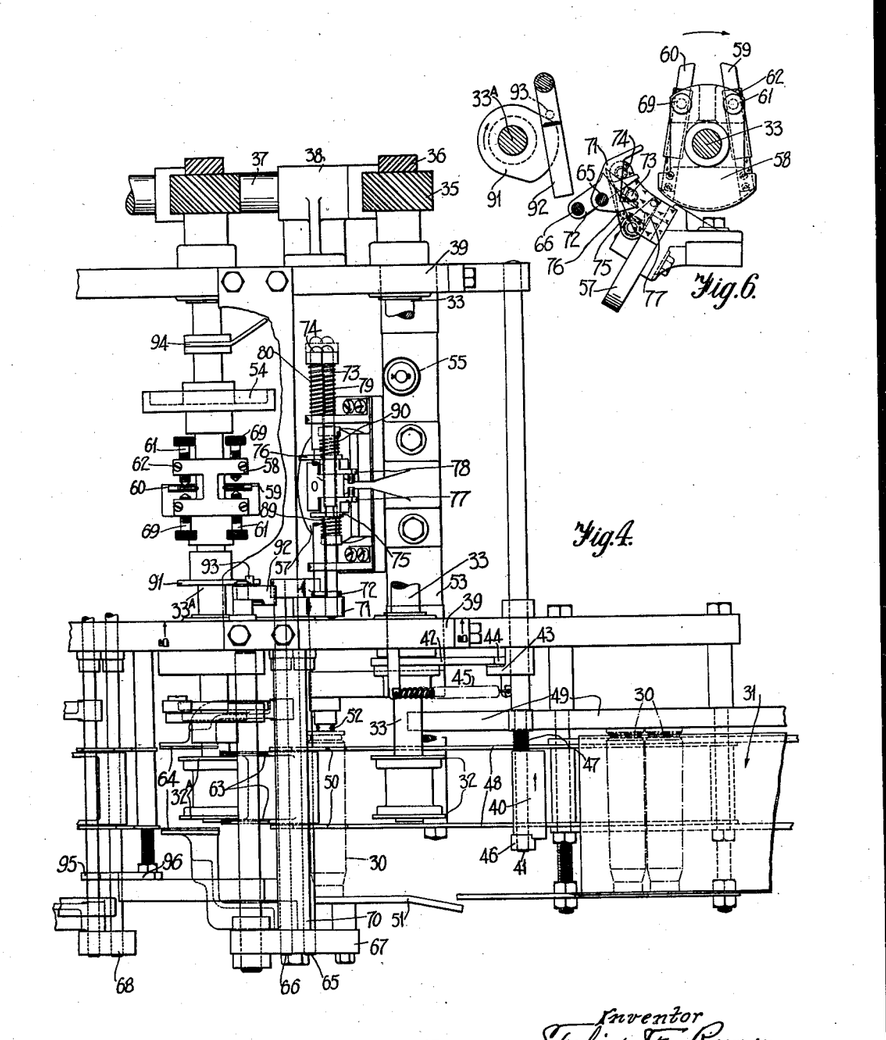
Figure 4 is a plan of Figure 3.
Figure 6 is a fragmental sectional elevation taken substantially on the line B—B of Figure 5.

In Figures 3 and 4 portions of a second gauging device are shown to which some reference will be made later. But it is primarily included to permit a second shaft 33A to be shown and in Figure 4 this second shaft is shown carrying a cam 54 and the armatures referred to later while the shaft 33 of the first gauging device is broken away to disclose the bar 53 carrying the cam roller 55 and a magnet and associated parts described in the next paragraph. The broken shaft 33 of course, carries a cam 54 and armatures as shown in Figure 3 in exactly the same manner as the second shaft 33A in Figure 4.

A magnetic field is provided by a permanent magnet 57 which is fixed to the axially sliding bar 53 for movement therewith, the magnet being of horse-shoe type. To the shaft 33 there is also secured for rotation therewith a carrier 58 which supports two indicator members which comprise armatures 59 and 60. The armatures are movable with the carrier as the latter rotates and are mounted on the carrier for movement along the longitudinal axis of the shaft. The armatures are made of magnetic material, preferably material which does not retain induced magnetism, and comprise strips which are disposed one behind the other in the direction of movement, i. e. rotation, of the carrier 58 and are so arranged that an end portion of each strip projects beyond the periphery of the carrier. As the construction and mounting of the armatures is identical with that described with reference to Figures 1 and 2, no further description is necessary here. The carrier is so disposed relatively to the magnet 57 that the projecting end portions of the armatures, during rotation of the carrier, pass between the poles of the magnet and across the lines of force emanating from the poles of the magnet. Further, the movement of the armatures axially is controlled by suitable non-magnetic stops, so that one armature is free to move one way along the shaft axis while the other is free to move in the opposite direction, whilst the springs forming the armature mountings urge the armatures towards their respective stops which latter are adjustable. As shown, these stops comprise fine threaded screws 61 having knurled heads. Locking screws 62 are also provided to lock the stops after setting.

The poles of the magnet are so spaced apart, the aforementioned stops so adjusted and the armatures so offset along the lines of force as to provide a neutral zone which theoretically is spaced either side of the centre-line between the magnetic pole faces and which provides a zone of tolerance. A plane, normal to the axis of the shaft 33 and containing said centre line will be referred to as the "neutral plane." The distance by which the armatures are offset is equal to the tolerance to be allowed and is determined by the amount the adjustable stops cause the armatures to lie apart considered along the axis of rotation of the carrier, that is the width of the zone equals the sum of the distances by which each armature is displaced from the neutral plane. Thus if the tolerance on the case length is plus or minus .0035" the sum of the distances of the armatures from the neutral plane is made .007". The magnet and the carrier are then so set up that the armatures lie against their respective stops in a manner such that they are equally disposed on opposite sides of the neutral plane when a case of exact length is being gauged. This means that during gauging operations there can be relative movement between the magnet and the carrier in the direction of the axis of the carrier by an amount up to .0035" in either direction without an armature being moved away from its stop towards a pole piece due to magnetic attraction. If, however, that axial movement is greater than .0035", then, according to the direction moved, one or other of the armatures will have been brought by the movement of the magnet to the other side of the neutral plane to that on which its stop is located and so will be magnetically attracted towards the pole on that side. If the tolerance is plus or minus .0035", the width of the neutral zone is .007". Thus, if a case has been gauged between the fixed element 51 and the moving member 52 and is within the tolerance, the armatures will both pass through the neutral zone and the case will be delivered to the next gauging operation. Should, however, the case be found to be too short, then the centre-line between the poles will have been moved to a position past the mid-thickness of one of the armatures, so that that armature, when considered in a direction normal to a plane transverse to the lines of force, will then be brought within a predetermined distance of the pole on the side opposite to that at which its stop is located, and will be moved towards that pole by magnetic attraction. When this occurs, mechanism described below is operated and causes the case to be ejected from the apparatus to a collecting device for cases which are so found to be too short. Similarly, if a case is determined as being too long, the magnetic field will be moved to such a position that the other armature will be attracted towards the opposite pole and so operate mechanism which causes that overlength case to be ejected and delivered to a position different from that to which the short cases are delivered.

In order to prevent undue friction, non-magnetic guards are mounted on the carrier and rotate with the armatures; thus, when an armature is attracted towards a pole it is arrested by the guard and does not actually make contact with the pole face. In the construction shown, these guards are constituted by screws 69 which are similar to the stop screws 61 previously mentioned.

The mechanism for ejecting defective cases comprises two pivoted flaps 63 and 64 over which a case is moved by the rotating transfer plates 32A of the second gauging device after a gauging operation by the first gauging device. As soon as the first gauging operation is finished the transfer device 32 brings a fresh case to the first gauging position and at the same time the long leading claw 34 pushes the gauged case off the V-shaped grooves 50 and it is then received by the claws of the second transfer device and if satisfactory is delivered to the second gauging position which will be described in more detail later.

The flaps 63 and 64 are fixed to spindles 65 and 66 which are journalled in one member of the frame 39 and in frame extension brackets 67 and 68 which are fixed to the frame 39 by stays 70. In Figure 3 one bracket 67 is shown broken away, with its outline in chain lines, to disclose parts covered by said bracket. It will be observed from Figure 4 that the flap 64 comprises two parts which are fixed to the spindle 66 but in Figure 3 only the rear part is shown to enable the flap 63 to be shown more clearly. To the spindles of the flaps there are secured catch arms 71 and 72 respectively, each of which normally rests, owing to the weight of the corresponding flap, against the periphery of a slidably mounted rod, a rod 73 being provided for the arm 71 and a rod 74 for the arm 72. Catch pawls 75 and 76 provided with torsion springs 89 and 90 engage with grooves in the sliding rods 73 and 74 respectively and each of these catch pawls is movable out of engagement with its rod by whichever one of two lifting arms 77 and 78 is operated and turned about its pivot by the projecting end portion of the corresponding armature, that is the one which has been attracted towards a pole of the magnet. The rods are spring urged by compression springs 79 and 80 so that when a catch pawl is lifted out of engagement the corresponding rod moves axially to the position indicated in chain lines in Figure 4 and out of contact with its catch arm 71 or 72 as the case may be, thus allowing the corresponding flap to drop and when the case is moved on towards the flap by the second transfer member 32A, it falls downwardly into a receptacle such as a magazine having openings to facilitate the removal of cases. As shown the flap 63 permits long cases to fall into a receptacle 81 while the flap 64 permits short cases to fall into a receptacle 82.

The receptacles consist of compartments in a box 83 having a hinged front wall 84. This is hinged at its base and so arranged that the top edge swings away from the plane of the paper as viewed in Figure 3. A side wall of the box forms one wall of the "long" compartment and is provided with a pair of upstanding plates or fingers 85 which project upwardly between the side plates of the flap 63 and provide a guide for the discarded long cases. The other compartment has one wall formed by a partition 86 which divides the box to form the two compartments while the rest of its walls are constituted by the walls of the box. Springs 87 are fixed to the edges of the partition to check the fall of the flap 64 as owing to its length this flap falls rather heavily and a spring 88 checks the fall of the long cases and prevents damage.

Suitable mechanism is provided to return whichever rod has been operated to its normal position, with its catch pawl in engagement ready for the next cycle. As shown in Figure 6 this mechanism comprises a cam 91 which is fixed to the shaft 33A or which may be fixed to an independent shaft if only one gauging operation is to be performed. A pivoted arm 92 has a pin 93 engaging the cam and as the arm swings it will, owing to its width, engage either of the catch arms 71 and 72 according to which one has been displaced by the fall of its flap. As a catch arm is moved back in this manner, its flap is raised and as the catch arm in question returns to the normal position (i. e. with the flap raised) another cam 94 on the shaft 33 engages with the rounded edge of the corresponding sliding rod 73 or 74 as the case may be and pushes it back to a position where the corresponding catch pawl springs into the groove in such rod whereupon the rod retains its catch arm and flap in the normal position.

When a tested case has been found to be within the desired limits it may be delivered into a receptacle or the transfer device 32 may deliver it directly to a further transfer device 32A which conveys the case through a further gauging or measuring operation as indicated in the drawings. The second gauging operation which is to determine the length of the case from base to the shoulder is conducted in the same manner as before and all the parts are generally similar in construction and function except for the fixed gauge element. In this case this consists of two parts, a fixed grooved member 95 and a co-operating movable member 96 which is operated by cam mechanism clearly seen in Figure 3. These two parts serve to grip the case by the neck and thus constitute a fixed element.

In another embodiment of the invention the magnet may be rotated or oscillated instead of rotating the carrier for the armatures. The modified construction is preferably manually operated although it can, if desired, be adapted for automatic operation.

Figure 7:
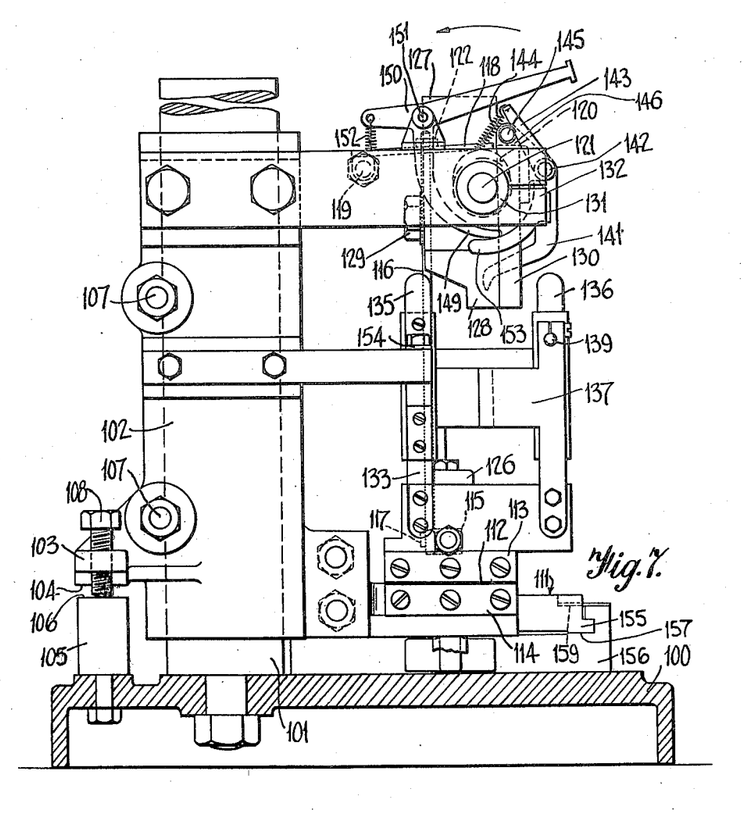
Figure 7 is a side elevation of a gauging machine of the kind known as a comparator.
Figure 8:
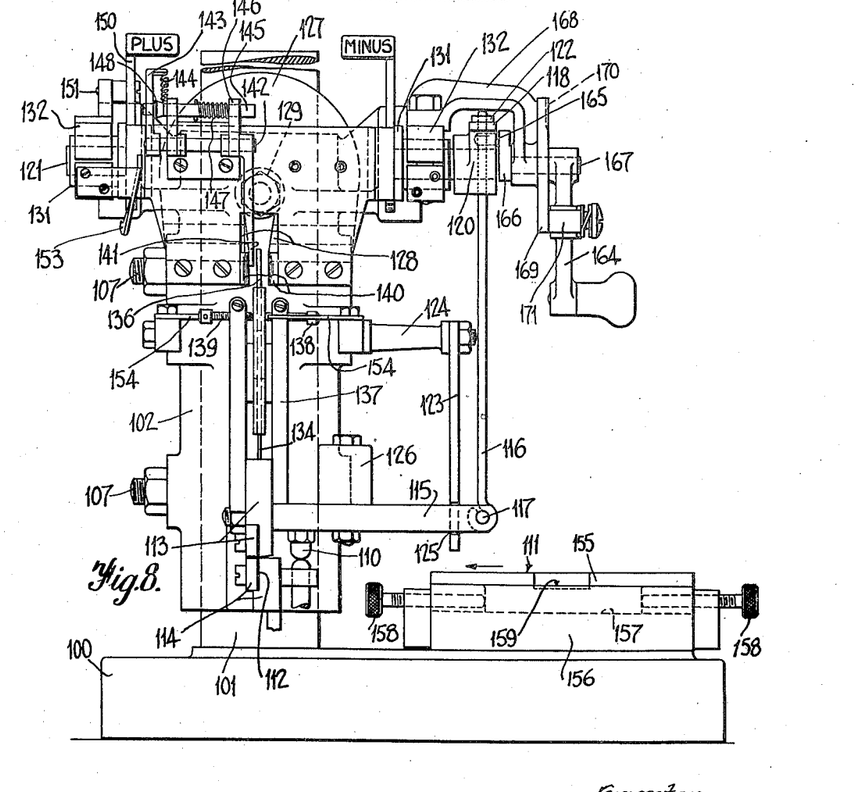
Figure 8 is a front elevation of Figure 7.
Figure 9:
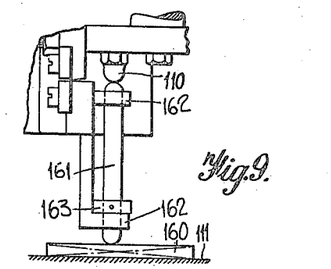
Figure 9 is a view illustrating a modification of a part of Figure 8.

Referring to Figures 7, 8 and 9, this embodiment of the invention is designed primarily for the purpose of gauging flat workpieces.

The apparatus is supported on a horizontal base or stand 100 from which projects a vertical pillar 101. About the pillar there is disposed a carrier 102 which is adapted to be movable relatively to the pillar in a vertical plane. The carrier is provided on one side with a lug or projection 103 which has a face 104 normal to the direction of movement of the carrier. To the support there is secured a post 105, the upper surface 106 of which is aligned with and parallel to the face 104. When setting the apparatus, a master gauge is placed between the face 104 and the upper surface 106 of the post and when the opposed faces each engage the gauge the carrier is locked in position on the pillar by clamp screws 107. A set-screw 108 is also provided and projects through the lug 103 and is arranged to engage the upper surface of the post 105 to prevent the possibility of the carrier slipping after the apparatus has been set and the gauge removed. The set-screw is preferably locked in position after setting.

The setting just described determines the position of a movable member which comprises a feeler 110 relatively to a horizontal table 111 which is mounted on the horizontal base 100 and described in more detail later. The feeler 110 is pivotally mounted on the carrier, the pivot for the feeler comprising a vertically disposed flat leaf spring 112 the upper and lower ends of which are secured in clamps 113 and 114. The clamp 114 is fixed to the carrier 102, see Figure 7, while the clamp 113 forms also a support for an arm 115 which carries the feeler 110.

A rod 116 is pivotally connected at 117 with the arm 115 and projects upwardly, the upper end being connected with a swinging lever 118 pivoted at 119 the movements of which are controlled by a cam 120 mounted on a rotatable shaft 121. Rotation of the shaft is effected manually or mechanically as hereafter explained. The rod 116 is movable relatively to the swinging lever so that while it is lifted by the lever 118 when the latter is moved in one direction, it permits the feeler to find its own position when lowered to effect a gauging operation. As shown, the rod 116 passes loosely through a hole in the lever 118 and is provided with a unit 122 for this purpose. A guard is provided, however, to control the extent of the movement of the feeler. This guard comprises a bar 123, Figure 8, suspended from a pillar 124 projecting from the carrier 102 and is provided with a slot 125 through which the feeler arm 115 projects. A counterweight 126 is disposed above the feeler.

To the shaft 121 above referred to there is secured in the manner described below a horseshoe permanent magnet 127 having adjustable pole-pieces 128 to regulate the magnetic field between the poles. The magnet is fixed by a bolt 129 to a bracket 130 which is fixed to the shaft 121 and made of brass or other suitable non-magnetic material. The pole-pieces are fixed to the bracket by screws passing through slots in the bracket. Thus the pole-pieces can be adjusted relatively to the magnet. Further the whole magnet assembly can be adjusted relatively to the carrier 102 in the following way: The shaft 121 rotates in bushes 131 clamped in arms 132 projecting from the carrier. By loosening these clamps the assembly can be shifted bodily along the shaft axis and any end play due to wear can be taken up.

Connected with the feeler arm for movement therewith that is, fixed to the upper clamp 113, are two upwardly extending flat leaf springs 133 and 134, the upper ends of which terminate with armatures 135 and 136 respectively, made of magnetic material, preferably material which does not retain induced magnetism. These indicators with their clamps and springs are constructed in the manner previously described in detail with reference to Figures 1 and 2. The leaf springs are provided so that an armature can be attracted to a magnetic pole without further movement of the feeler. To permit movement of the leaf springs in one way only, an upwardly extending rigid member 137 is fixed to the feeler arm for movement therewith, terminating with stop screws 138 and 139 respectively for each feeler. These stop screws are fitted in such a manner that each armature can be attracted to one pole of the magnet only, that is, one armature is movable towards the north pole and the other is movable towards the south pole. The leaf springs are adapted to be drawn towards one or other of the poles of the magnet according to whether a workpiece being gauged is under or over size.

As in the case of the apparatus described above for gauging cartridge cases, there is between the poles of the magnet a neutral zone representing the tolerance allowed. This zone is adjustable by shifting the magnet or the pole pieces as above described. Whereas, however, in the cartridge case gauging apparatus the armatures are rotated, in the present apparatus it is the magnet which is rotated. The extent of movement of the armatures due to the different positions occupied by the feeler is limited by adjustable stops 154 to avoid the magnet fouling the armatures. Non-magnetic stops comprising cheeks 140 on the pole-pieces are also provided to prevent the armatures being attracted into actual engagement with the poles of the magnet so as to avoid friction between the poles and the armatures.

When the feeler has determined that a workpiece does not conform to the desired standard, the appropriate armature will be so positioned as to be attracted towards a pole of the magnet. A pawl 141 pivoted at 142 movable in timed relationship with the magnet is thereby caused to engage the armature in question as the magnet is rotated and is turned about its pivot. This movement of the pawl is transmitted to a lever 143 mounted on the same pivot as that of the pawl and connected to a spring 144. This action causes a spring controlled axially movable pin 145 to be released and to move lengthwise. The arrangement is best seen in Figure 8 where the pin 145 is slidably mounted in bearings 146 and urged towards the left by a spring 147. A collar 148 is formed on the pin and catches against the lever 143 until the latter is moved by the armature as above mentioned. Thus the subsequent path of the pin, which latter is movable with the magnet assembly is such as to cause the pin to engage a cam 149 connected with a bell-crank lever 150. This latter is pivoted at 151 in a support fixed to the arm 132 of the carrier and one arm of the bell-crank is controlled by a spring 152 while the other supports a sign such as "plus" or "minus." Engagement of the pin 145 with the pivoted cam 149 causes the arm bearing the sign to be depressed, thus giving a visual indication of the result of the gauging operation and so enabling the operator to sort the workpieces according to the findings of the apparatus. A pivoted cam and the associated parts is provided for each of the armatures but only one set is shown in Figure 8.

A cam 153 fixed to an arm 132 is provided to return this mechanism to its normal position by pressing the pin 145 to the right before the next workpiece is dealt with.

The table 111 on which a workpiece is supported during a gauging operation is made in two parts, an upper slidable part 155 and a fixed base 156. The two parts are in engagement with each other on the line 157, Figure 8 and the engaging surfaces are sloping surfaces. Adjusting screws 158 are provided to move the two parts relatively to one another so as to adjust the height of the table. A vernier gauge is provided at 159 to determine the extent of the adjustment. By this means provision is made for the permissible tolerance, and the necessary adjustments are made to the relative alignment of the armatures to obtain the neutral zone.

Referring to Figures 8 and 9, the table 111 is not shown in position for gauging in Figure 8 but would require moving in the direction of the arrow to bring it beneath the feeler 110. The latter would ordinarily require to be longer than shown for convenience in working so that the table could pass beneath the carrier to enable pieces of fair area to be gauged. It is, however, necessary to keep the feeler 110 as near as possible to the spring 112 for the sake of a high ratio of the leverage of feeler and indicator and if the feeler 110 is made of considerable length its operative end would have an undesirable degree of swinging movement about the pivot spring. The construction shown in more detail in Figure 9 is intended to meet these requirements and to give the machine a fuller range than where the feeler is in direct contact with the workpiece. In Figure 9 a workpiece 160 is shown on the table 111 and is engaged by a loose feeler 161 slidable in bearings 162. A collar 163 is fixed to the loose feeler to prevent it from falling and in practice the workpiece is pushed along the table and beneath the rounded end of the loose feeler 161 and then the magnet is rotated.

The shaft 121 is rotated in the direction of the arrow Figure 7 by a handle 164 but in order to prevent shocks being transmitted to the magnet assembly by rough or careless handling, the handle 164 is not fixed on the shaft 121 but is coupled thereto by a pin 165 fixed on a crank 166 which is in turn fixed to a shaft 167 separately journalled in a bracket 168. The pin 165 works in a hole in the cam 120.

Provision is also made to prevent the handle from being turned in the wrong direction. This provision comprises a fixed disc 169 concentric with the axis of rotation of the shaft 167 and provided with a groove 170 in that face which is nearest the handle. On the handle there is provided a spring controlled catch 171 which frictional engages the face of the disc and which is so arranged as to enter the groove and lock against the disc if an attempt is made to turn the handle in the wrong direction. The groove also serves as an indication as to when the handle is in position to commence a gauging operation.

In the various embodiments of the invention above described, the armatures may in time become magnetized by frequent contact with the poles. In order to demagnetize such elements they may be caused to move through a second magnetic field in which the polarity of the poles is reversed. Alternatively the magnetic poles between which the elements are moved may be magnetized by an alternating current. This renders demagnetization of the elements unnecessary.

A simpler way of overcoming the magnetizing effect of the magnet is to construct the ends of the indicator arms of the material sold under the name "Mumetal" which does not retain any appreciable amount of magnetism.

The foregoing constructions employ a magnet system embodying two adjacent poles of opposite polarity and this is the most convenient form for general use. But it is possible to employ adjacent poles of like polarity in conjunction with an armature which is unmagnetized except by induction from the poles or which is itself constructed as a magnet with the end adjacent the two poles of opposite polarity to such poles.

In each of the embodiments of the invention above described relative movement is effected between an armature and the magnetic poles across the lines of force of the field and further relative movement is effected between the armature and the poles, the extent of such latter movement being determined by an article or an object being tested, so that the armature is capable of movement towards a pole by magnetic attraction when the armature is within a predetermined distance from that pole.

What I claim as my invention and desire to secure by Letters Patent is:

1. Testing apparatus adapted to reject or separate "defective" cigarettes from "satisfactory" cigarettes, comprising in combination, a pair of elements arranged to engage the opposite ends of a cigarette, at least one element of the pair comprising an armature and being resiliently mounted to move inwardly towards the other, a magnet, one pole of which magnetically attracts the armature when the said elements are spaced apart by a predetermined distance, said movement of the armature due to magnetic attraction causing "satisfactory" cigarettes to be released from the said elements, and means to release a "defective" cigarette from the said elements at a different position.

2. Apparatus as claimed in claim 1, wherein the armature is moved past the pole in a plane substantially normal to the direction in which one of the said elements is resiliently urged towards the other.

3. Testing apparatus as claimed in claim 1, wherein the pole is resiliently supported and wherein means is provided to adjust the position of the magnet in a direction transverse to the direction of movement of the armature past the pole.

4. Testing apparatus as claimed in claim 1, wherein the armature is movable between two magnetic poles.

5. Testing apparatus comprising in combination a magnetic device having a magnet, a stop, and an armature mounted so as to be yieldingly urged in one direction against said stop, means to effect relative movement between a pole of the magnet and the armature across the lines of force emanating from said pole and means responsive to a physical characteristic of an article being tested to effect relative movement between the armature and a pole of the magnet in a direction parallel to the magnetic lines of force emanating from said pole to an extent determined by such characteristic, so that when the armature is within a predetermined distance from the said pole it is movable towards the said pole in said direction by magnetic attraction.

6. Testing apparatus comprising in combination, a magnetic device having a stop, an armature movable between two magnetic poles and yieldingly urged in one direction against said stop, means to effect relative movement between a pole of the magnet and the armature across the lines of forces emanating from said pole, and means responsive to a physical characteristic of an article being tested to effect relative movement between the armature and the poles in a direction parallel to the magnetic lines of force emanating from said poles to an extent determined by such characteristic, so that when the armature is within a predetermined distance from a pole on the opposite side of the armature to that at which the stop is located it is movable towards that pole by magnetic attraction.

7. Testing apparatus comprising in combination, a magnetic device having two armatures which are movable between two magnetic poles during a testing operation and which are offset along the lines of force by a distance equal to the tolerance to be allowed, stops to limit the said distance between the armatures in the offset relationship, and means responsive to a physical characteristic of an article being tested to effect relative movement between the armatures and the said poles to an extent determined by such characteristic, so that when an armature is, when considered in a direction normal to a plane transverse to the lines of force, within a predetermined distance from a pole on the side opposite to that at which its stop is located, the armature will be caused to move by magnetic attraction towards that pole.

8. Testing apparatus comprising the combination of a magnetic device having a magnet, a stop and an armature mounted so as to be resiliently urged in one direction towards the stop, means to effect relative movement between a pole of the magnet and the armature across the lines of force emanating from said pole, and means responsive to a physical characteristic of an article being tested to effect relative movement between the armature and the said pole in a direction parallel to the lines of force emanating from said pole to an extent determined by such characteristic, so that when the armature is within a predetermined distance from the pole it is movable by magnetic attraction towards the latter in the opposite direction to that in which it is resiliently urged.

9. Testing apparatus comprising in combination a magnetic device having a magnet and an armature supported for relative movement, and means responsive to a physical characteristic of an article being tested to effect relative movement between the armature and a pole of the magnet in a direction parallel to the magnetic lines of force emanating from said pole to an extent determined by such characteristic, so that when the armature is within a predetermined distance from the said pole it is movable towards the said pole in said direction by magnetic attraction, and means to effect relative movement between the armature and the pole in a plane substantially normal to the direction of the first named relative movement and independently thereof.

10. Testing apparatus comprising in combination a magnetic device having a magnet and an armature supported for relative movement, and means responsive to a physical characteristic of an article being tested to effect relative movement between the armature and a pole of the magnet in a direction parallel to the magnetic lines of force emanating from said pole to an extent determined by such characteristic, so that when the armature is within a predetermined distance from the said pole it is movable towards the said pole in said direction by magnetic attraction, a stop for limiting movement of said armature away from said pole, and means yieldingly urging said armature toward said stop.

11. Testing apparatus comprising in combination, a magnetic device having two armatures which are movable between two magnetic poles during a testing operation and which are offset along the lines of force by a distance equal to the tolerance to be allowed, stops to limit the said distance between the armatures in the offset relationship, and means responsive to a physical characteristic of an article being tested to effect relative movement between the armatures and the said poles to an extent determined by such characteristic so that when an armature is, when considered in a direction normal to a plane transverse to the lines of force, within a predetermined distance from a pole on the side opposite to that at which its stop is located, the armature will be caused to move by magnetic attraction towards that pole, said poles being of like polarity and said armatures being of unlike polarity.

12. Testing apparatus comprising in combination a magnetic device having a magnet a reciprocable carrier therefor, a stop and an armature mounted so as to be resiliently urged in one direction against said stop, means to effect relative movement between a pole of the magnet and the armature across the lines of force emanating from said pole, and means responsive to a physical characteristic of an article being tested to effect relative movement between the armature and a pole of the magnet in a direction parallel to the magnetic lines of force emanating from said pole to an extent determined by such characteristic, so that when the armature is within a predetermined distance from the said pole it is movable towards the said pole in said direction by magnetic attraction, said last said means including a member movable during a testing operation to a position determined by the said characteristic of the article, said member being coupled to the carrier.

13. Testing apparatus comprising in combination a magnetic device having a magnet and an armature supported for relative movement, said magnet and armature being adapted to engage, respectively, the opposite ends of an article to be tested, means responsive to a physical characteristic of an article so engaged and being tested to effect relative movement between the armature and a pole of the magnet in a direction parallel to the magnetic lines of force emanating from said pole to an extent determined by such characteristic, so that when the armature is within a predetermined distance from the said pole it is movable toward the said pole in said direction by magnetic attraction, such movement of the armature effecting the release of satisfactory articles, and means to release defective articles from said magnet and armature at a different position.

14. Testing apparatus comprising in combination a magnetic device having a magnet, a stop, and an armature mounted so as to be yieldingly urged in one direction against said stop, means to effect relative movement between a pole of the magnet and the armature across the lines of force emanating from said pole, means responsive to a physical characteristic of an article being tested to effect relative movement between the armature and the said pole of the magnet in a direction parallel to the magnetic lines of force emanating from said pole to an extent determined by such characteristic, so that when the armature is within a predetermined distance from the said pole, it is movable towards the said pole in said direction by magnetic attraction.

15. Testing apparatus comprising in combination, a magnetic device having two armatures which are movable between two magnetic poles during a testing operation and which are offset along the lines of force by a distance equal to the tolerance to be allowed, stops to limit the said distance between the armatures in the offset relationship, means to effect relative movement between a pole of the magnet and the armature across the lines of force emanating from said pole, and means responsive to a physical characteristic of an article being tested to effect relative movement between the armature and the poles in a direction parallel to the magnetic lines of force emanating from said poles to an extent determined by such characteristic, so that when the armature is within a predetermined distance from a pole, it is movable towards that pole by magnetic attraction.

16. Testing apparatus comprising in combination, a magnetic device having two armatures which are movable between two magnetic poles during a testing operation and which are offset along the lines of force by a distance equal to the tolerance to be allowed, stops to limit the said distance between the armatures in the offset relationship, means responsive to a physical characteristic of an article being tested to effect relative movement between the armatures and the said poles to an extent determined by such characteristic, so that when an armature is, when considered in a direction normal to a plane transverse to the lines of force, within a predetermined distance from a pole on the side opposite to that at which its stop is located, the armature will be caused to move by magnetic attraction towards that pole, and means yieldingly urging such pole and armature apart.

17. Testing apparatus comprising in combination, a magnetic device having two armatures which are movable between two magnetic poles during a testing operation and which are offset along the lines of force by a distance equal to the tolerance to be allowed, stops to limit the said distance between the armatures in the offset relationship, means responsive to a physical characteristic of an article being tested to effect relative movement between the armatures and the said poles to an extent determined by such characteristic so that when an armature is, when considered in a direction normal to a plane transverse to the lines of force, within a predetermined distance from a pole on the side opposite to that at which its stop is located, the armature will be caused to move by magnetic attraction towards that pole, and means yieldably resisting such movement, said poles being of like polarity and such armatures being of unlike polarity.

18. Testing apparatus comprising in combination, a magnetic device having two magnetic poles and two armatures which are yieldably mounted, said armature being movable between said magnetic poles during a testing operation and being offset in the direction of the lines of force in the gap between the poles, stops to limit the said distance between the armatures in the offset relationship and against which the respective armatures are yieldably urged, means responsive to a physical characteristic of an article to be tested to effect relative movement between the armatures as a pair and the said poles to an extent determined by such characteristic, so that when an armature is moved to within a predetermined distance, considered in a direction normal to a plane transverse to the lines of force across the gap, from a pole on the side opposite to that at which its stop is located, that armature will be caused to move by magnetic attraction towards said pole, means to effect relative movement between the armatures and the poles, in a direction across the lines of force passing between said poles, and sorting mechanism operable in response to such relative movement in said last named direction for sorting tested articles in accordance with said physical characteristics.

19. Testing apparatus comprising in combination, a magnetic device having a magnet with two magnetic poles, a reciprocable carrier therefor, two armatures which are yieldably mounted, which are movable between said magnetic poles during a testing operation and which are offset in the direction of the lines of force in the gap between the poles, stops to limit the said distance between the armatures in the offset relationship and against which the respective armatures are yieldably urged, means responsive to a physical characteristic of an article being tested to effect relative movement between the armatures as a pair and the said poles in a direction parallel to the magnetic lines of force emanating from said poles to an extent determined by such characteristic, so that when an armature is moved to within a predetermined distance from a pole on the side opposite to that at which its stop is located, that armature will be caused to move by magnetic attraction towards said pole, and means to effect relative movement between the armatures and the poles across the lines of force passing between said poles, wherein the means to effect relative movement between the armatures and the pole to an extent determined by a physical characteristic of an article being tested, comprises a member movable during a testing operation to a position determined by the said article, and wherein the movable member is operatively coupled to the reciprocable carrier on which the magnet is supported.

FÉLIX FRÉDÉRIC RUAU.